United States Patent [19]

Horton

[11] 3,769,044

[45] *Oct. 30, 1973

[54] COMPOSITIONS AND METHODS FOR MAKING MOLDED REFRACTORY ARTICLES

[75] Inventor: Robert A. Horton, Chesterland, Ohio

[73] Assignee: Precision Metalsmiths, Inc., Cleveland, Ohio

[ * ] Notice: The portion of the term of this patent subsequent to Aug. 22, 1989, has been disclaimed.

[22] Filed: Feb. 22, 1971

[21] Appl. No.: 117,775

Related U.S. Application Data

[63] Continuation-in-part of Ser. No. 94,580, Dec. 2, 1970, Pat. No. 3,686,006.

[52] U.S. Cl............. 106/38.3, 106/38.35, 106/38.4, 106/38.5, 106/38.6, 106/55, 106/69, 260/13, 260/17.4, 264/63, 264/65

[51] Int. Cl........................ B28b 7/28, C04b 35/64

[58] Field of Search ................. 264/63, 65; 106/55, 106/38.35, 38.24

[56] References Cited

UNITED STATES PATENTS

| | | | |
|---|---|---|---|
| 3,325,570 | 6/1967 | Blum et al. ........................ | 264/63 X |
| 3,330,892 | 7/1967 | Herrmann............................ | 264/63 |
| 3,346,680 | 10/1967 | Bush .................................. | 264/63 X |
| 2,486,410 | 11/1949 | Howatt ................................ | 264/63 |
| 2,434,271 | 1/1948 | Howatt ................................ | 264/63 |
| 3,234,308 | 2/1966 | Herrmann............................ | 264/63 |

*Primary Examiner*—Theodore Morris
*Attorney*—Watts, Hoffmann, Fisher & Heinke

[57] ABSTRACT

An injection moldable refractory mixture containing comminuted refractory material as the major component, a sublimable binder, and a non-sublimable binder which is at least in part ethyl cellulose.

2 Claims, No Drawings

COMPOSITIONS AND METHODS FOR MAKING MOLDED REFRACTORY ARTICLES

CROSS-REFERENCE TO RELATED APPLICATION

This is a continuation-in-part of application Ser. No. 94,580, filed Dec. 2, 1970 in the name of Robert A. Horton and assigned to a common assignee, now U.S. Pat. No. 3,686,006 granted Aug. 22, 1972.

BACKGROUND OF THE INVENTION

The present invention relates generally to molded refractory articles, such as cores employed in metal casting processes, and more specifically to refractory compositions and methods suitable for making such articles by injection molding.

Various refractory compositions have been employed in the past to make articles such as cores by injection molding. One such composition consisted essentially of comminuted refractory material mixed with a thermoplastic binder, e.g., ethyl cellulose, and a voltage liquid plasticizer such as n-butyl stearate. Articles molded from this composition were subjected to a drying step by heating to a temperature of about 450°F. in order to evaporate the plasticizer. In carrying out the drying step, it was necessary to heat the molded articles slowly for a long period of time so as to avoid vaporizing the plasticizer faster than the vapor could be dissipated through the pores of the refractory articles. Otherwise, the articles would crack and blister. The drying step usually took 70 hours or more.

An improvement to the foregoing composition consisted of the addition of a thermosetting resin material, such as shellac. The purpose of the shellac or other thermosetting material was to develop a preliminary bond which would impart sufficient strength to the molded articles that the drying step could be carried out quicker than in the past. When using such a composition, the drying time was reduced to about 24 hours.

Another conventional refractory mixture used for injection molding consisted essentially of comminuted refractory material, an organic binder having a high solid state vapor pressure, e.g., naphthalene, paradichlorobenzene and camphor, and either a colloidal ceramic material or a thermosetting resin, such as shellac or silicone resins. Because of the high solid state vapor pressure of the organic binder, the time required for drying the articles after molding was reduced. The collodial ceramic and/or the thermosetting resin was included in the composition in an effort to overcome the problem of "bleeding" during injection. The term "bleeding" refers to separation of the organic binder under pressure leaving behind a ceramic-rich mixture having insufficient plastic flow properties to permit successful injection. In spite of the addition of the colloidal ceramic or thermosetting resin, bleeding remained a persistent problem when injection molding refractory mixtures including an organic binder having a high solid state vapor pressure.

Another known composition similar to the foregoing included the same high vapor pressure organic binder which could be sublimed out of the molded articles, an organic deflocculant, and a small amount of a second binder which was provided in an attempt to improve the green strength so that the molded articles could be handled without damage prior to sintering. The specific materials used in the composition to impart green strength were carnauba wax, polyethyl methacrylate resin, polyethylene glycols, polyvinyl acetate resin, micro-crystalline waxes, styrene resins, chlorinated napthlene, and polyvinyl alcohol resin. This composition, as in the case of the one previously described, was subject to bleeding during injection. Another disadvantage resided in the relatively poor strength and hardness of the articles both before and after sublimation. The specific binders which were used did not provide the strength and hardness necessary to resist breakage and damage during handling, etc.

SUMMARY OF THE INVENTION

The present invention is based on the discovery that the addition of ethyl cellulose to a refractory mixture which includes a high vapor pressure, sublimable binder is especially effective in preventing bleeding during injection, i.e., separation of the sublimable binder, and that it also results in unexpected improvements in the physical properties of the molded refractory articles.

Preferred compositions of the invention include comminuted refractory material as the major component, a sublimable binder capable of being sublimed out of articles molded from the mixture to produce a porous structure, and at least 0.8% by weight of a non-sublimable binder capable of forming a preliminary bond to hold the molded articles intact prior to subsequent hardening operations. The non-sublimable binder is comprised of ethyl cellulose in an amount of from 4.5–100 percent by weight with the ehtyl cellulose being present in a minimum amount of 0.5 percent by weight of the total weight of the mixture.

In accordance with the above-referenced copending application, Ser. No. 94,580, the pore structure of refractory cores or other articles molded from the foregoing composition may be impregnated with a strengthening and hardening agent. The preferred material used for impregnation is a refractory binder in a carrier liquid. In an alternate procedure, the molded refractory articles may be fired and sintered subsequent to sublimation.

In addition to preventing bleeding or separation of the sublimable binder during injection, the ethyl cellulose has been found to be very effective in increasing the strength and hardness of the molded articles prior to their being impregnated or sintered. For example, transverse strength tests run on specimens molded from a refractory mixture containing ethyl cellulose have demonstrated a 76 percent increase in the average modulus of rupture compared to specimens made from the identical composition except for the substitution of silicone resin for the ethyl cellulose. This increased strength resulting from the ethyl cellulose frequently permits injection molded articles to be ejected and handled sooner than in the past, thereby shortening the mold cycle times.

The ethyl cellulose is compatible with the various subliming binders used in preparation of the refractory mixtures, and it goes into solution rapidly at low temperatures. This makes it easier to prepare the refractory mixtures and reduces losses of the volatile, subliming binder, during preparation, thereby producing more consistent results.

Other advantages and a fuller understanding of the invention will be had from the following detailed description.

DESCRIPTION OF THE PREFERRED EMBODIMENT

As generally described above, the injection moldable mixture of this invention consists essentially of comminuted refractory material as the major component, a sublimable binder, and a non-sublimable binder which is at least in part ethyl cellulose. Any of the refractory materials which are conventionally used for making ceramic cores and the like can be employed in preparing the mixture. Typical refractories include fused and crystalline silica, zircon, zirconia, alumina, calcium zirconate, various aluminum silicates, tricalcium phosphate, nepheline syenite, and the like.

A sublimable binder is included in the mixture so that a porous structure can be produced by subliming the binder from a core or other article molded from the mixture. The term "sublimable binder" is used to mean any material which has a sufficiently high vapor pressure that it can be sublimed at a temperature below its softening point and below the softening point of the non-sublimable binder. The materials which are useful as the sublimable binder are generally characterized by the capability of being changed from a solid to a flowable state and of being resolidified, and by a vapor pressure of at least 0.1 mm of Hg at the triple point under normal atmospheric pressure. It has been found that materials having a vapor pressure of at least 0.1 mm of Hg at the triple point under normal atmospheric pressure can be sublimed from the molded articles in a reasonable length of time either with only moderate heating or with no heating at all. The more preferred materials have a triple point above normal room temperature and can be sublimed at room temperature in order to avoid the danger of distorting the molded articles by excessive heating. Such materials have a vapor pressure of at least 0.1 mm of Hg at room temperature under atmospheric pressure and have a boiling point which is no higher than about 250°C. and which more preferably is 200°C. or less. The preferred sublimable binders are solids at room temperature in order to avoid the necessity of refrigerating to cause solidification, and are further characterized by the capability of being melted to a flowable state upon heating and of resolidifying upon cooling.

Exemplary materials which exhibit the foregoing characteristics and are capable of serving as sublimable binders include aliphatic and substituted and unsubstituted aromatic compounds. Paradichlorobenzene is a particularly suitable compound which has a conveniently low melting point, good molding properties, low cost, and the capability of being readily sublimed. Other exemplary materials which have been found satisfactory include urethane (ethyl carbamate), acetamide, naphthalene, benzoic acid, phthalic anhydride, camphor, anthracene, and parachlorobenzaldehyde. Other exemplary materials which display similar properties and are contemplated for use include 1-bromo-4chlorobenzene, paradimethoxybenzene, paradibutoxybenzene, and crotonic acid. The vapor pressures of materials such as paradichlorobenzene, urethane, acetamide, camphor, and naphthalene are sufficiently high that these materials can be sublimed at room temperature under normal atmospheric pressure or at pressures below atmospheric. Materials such as phthalic anhydride, benzoic acid, and anthracene have a lower vapor pressure at room temperature and, while useful for the purposes of the present invention, require heating to facilitate sublimation.

A non-sublimable binder is included in the mixture to hold the molded articles intact when the sublimable binder has been removed and before the articles have been either sintered or impregnated with a strengthening and hardening agent. The term "non-sublimable binder" is used to mean any material which is capable of being hardened, preferably at room temperature, to impart the necessary strength to the molded articles and which has a sufficiently low vapor pressure that it will not melt, sublime or evaporate at the temperatures and under the pressures employed to effect removal of the sublimable binder. The useful non-sublimable binders are further characterized by being miscible with the sublimable binder when it is in a fluid state. In addition to performing its primary function of imparting hardness and green strength to the molded articles, the non-subliming binder or combination of such binders may be selected to impart other desired characteristics such as improving fluidity in the molding process, reducing the set-up time of the mixture, etc.

In accordance with the present invention, the non-sublimable binder is at least in part ethyl cellulose. Ethyl cellulose is an ethyl ether of cellulose in which some or all of the replaceable OH groups on the anhydroglucose units of the cellulose chain have been replaced by ethoxyl groups. Commercial products generally have an average of about 2.15 to about 2.60 of the three replaceable OH groups on each anhydroglucose unit substituted, and such products are well suited for the purposes of the invention. One particular commercial product which has been found satisfactory is sold under the tradename Standard Ethoxy Grade 20 cps, by the Dow Chemical Company. As explained above, ethyl cellulose acts to prevent bleeding or separation of the sublimable binder under pressure during injection, as well as improving the green strength and hardness of the molded articles.

Other exemplary materials which may be used in combination with the ethyl cellulose to function as the non-sublimable binder include various resinous and plastic materials. Examples of suitable resins are polymerized rosins, hydrogenated rosin esters, petroleum hydrocarbon resins, coumarone-indene resins, ester gums, polyterpene resins, low molecular weight styrene polymer resins, chlorine polyphenyl resins, gilsonite, abeitic acid, shellac, and silicone resins. Examples of suitable plastic materials include, in addition to ethyl cellulose, polystyrene, polyvinyl acetate and polyvinyl alcohol.

The total binder content (subliming and non-subliming binders) may vary within a range of about 10 to 40 percent by weight of the mixture, and more preferably from about 20 to 30 percent by weight of the mixture. The subliming binder should be at least one-half of the total binder content, and usually is at least 80 percent of the total binder content. The amount of the subliming binder used in preparation of the mixture may vary widely over a range of from about 10 to 35 percent by weight of the mixture with a more preferred range being from about 18 to 25 percent by weight of the mixture.

The amount of the non-subliming binder may vary from about 0.8 to 11 percent by weight of the mixture with a more preferred range being from about 2 to 5.5 percent by weight of the mixture. The non-subliming binder content contains ethyl cellulose in an amount of from about 4.5 to 100 percent by weight, with the lower limit of the ethyl cellulose being 0.5 percent by weight of the total weight of the mixture. Where the ethyl cellulose is used as the sole non-subliming binder, an amount of at least 0.8 percent by weight is considered necessary and this represents the lower limit for the non-subliming binder content.

Generally, the non-subliming binder will be near the lower limit of its range when the subliming binder content is near the upper limit of its range. The minimum amount of the non-subliming binder is that required to impart sufficient strength to the molded articles that they can be handled successfully after molding. Higher amounts may be desired to provide extra strength to articles which are subsequently impregnated or to modify the injection or plastic flow properties of the mixture so as to facilitate the injection molding operation. When the non-subliming binder does not consist entirely of ethyl cellulose, a content somewhat higher than the indicated lower limit, i.e., 0.8 percent by weight, is usually desirable. A subliming binder content near its lower limit is generally used in conjunction with the more dense refractories, and in such mixtures the non-subliming binder is usually required to be at or above the mid-point of its range in order to provide sufficient fluidity for molding operations. A subliming binder content near its upper limit is generally used in conjunction with the lighter refractories or where very fluid mixtures are desirable for particular molding operations. The subliming binders typically have sharp melting points and melt to thin liquids. As a result, the forming properties of the mixture based solely on the subliming binders are often poor. The forming properties of the mixture are greatly improved by the proper selection of the non-sublimable binders, including ethyl cellulose.

The comminuted refractory and binders are mixed together by any suitable procedure. For example, when using the preferred materials, the binders may be heated and blended together in a suitable mixer and the comminuted refractory material added to the blend until the mixture is of the desired consistency for the molding operation. If desired, the refractory material may be warmed prior to adding it to the blended binders. The resulting mixture may be molded while hot or it may be solidified and subsequently melted for the molding operation. Refractory articles, such as cores, can be quickly and inexpensively formed by injection molding using conventional plastic injection molding machines. For purposes of injection molding, the mixture is cooled and granulated, as by stirring the melt as it cools to solidification, and the granules are charged into the injection molding machine in the conventional manner. The refractory mixture also can be employed in any of the other well-known techniques for forming cores and the like. Such alternate techniques include casting or pouring, transfer molding, extruding, etc.

After the articles have been injection molded or otherwise formed, the sublimable binder is removed from the articles. An outstanding advantage of the preferred sublimable binders, namely, materials having a vapor pressure of at least 0.1 mm of Hg at the triple point, and more especially materials which have a vapor pressure of .1 mm of Hg at room temperature and a boiling point which is no higher than 250°C. and more preferably is 200°C. or less, is that the binders can be sublimed from the molded articles with very little shrinkage occurring even when the subliming binder is present in large amounts. Many of the useful sublimable binders will tend to escape from the molded articles upon standing at room conditions. In the case of very thin articles, all of the sublimable binder may be lost in this manner within a reasonable length of time. Preferably, however, sublimation is facilitated by subjecting the articles to a partial vacuum, as by placing the articles in a chamber connected to a vacuum pump, or by moderately heating the articles, or by a combination of moderate heating and application of a partial vacuum. The procedure of subjecting the articles to reduced pressure in a vacuum chamber is extremely effective and avoids the possibility of warpage. While heating of the articles is useful to facilitate sublimation, it must be done carefully to avoid distortion caused by excessive heat.

After the subliming binder has been removed, the molded articles may be either fired and sintered or impregnated with a strengthening and hardening agent. In the case of sintering, the firing and cooling temperatures and times are those commonly employed for the particular comminuted refractory material used in the composition. Typical sintering temperatures are in excess of 2000°F.

The sintering operation can be eliminated by impregnating the porous articles after sublimation with a strengthening and hardening agent, and this procedure is preferred when making ceramic cores such as are used in investment casting processes. The practice of firing molded cores at high temperatures may result in sintering shrinkage which makes it difficult to control dimensions and prevent warpage. It also reduces the porosity of the cores so that they are not readily permeable to the hot mold gases, and this results in gas entrapment in metal castings which are produced using the sintered cores. High temperature sintering of refractory cores can produce excessive strength which is undesirable during the casting operation. Excessive strength can cause hot tearing of metal castings and can make it difficult easily to remove the cores from the casting. Also, the practice of firing the molded cores to sinter the refractory requires special equipment, materials and operations which contribute to the cost of production. All of these disadvantages are avoided by the preferred impregnating operation.

The impregnating operation involves at least partially impregnating the pores of the molded cores formed by removal of the sublimable binder with a material selected to serve three functions. The material used for impregnation increases the strength and hardness of the sublimed cores so that it can readily withstand the stresses encountered in handling, shipping, pattern injection, and other precasting operations. Secondly, the material used for impregnation provides a continuous bond to hold the molded core together when an investment mold containing the core is fired preparatory to casting metal into the mold. At normal investment mold firing temperatures ranging from about 1600°F. to about 2000°F., the non-sublimable binder in the core may be eliminated so that the core strength depends entirely upon the impregnating material. A third and related function of the material which is impregnated into the pore structure is to provide sufficient strength to enable the core to resist the stresses encountered when molten metal is cast into the mold against the core.

The impregnating materials are any of the refractory binders commonly employed in investment casting processes. Such binders are distinguished by the capability of being dried, chemically gelled or precipitated to form a continuous, preferably noncrystalline, bonding structure. The refractory binders may be classified as being either colloidal-type or solution-type binders. The class of colloidal-type binders is broad and includes hydrolyzed alkyl silicates, silica sols or dispersions, and dispersions or suspensions of various inorganic silicates. Examples of hydrolyzed alkyl silicates include isopropyl silicate, the various ethyl silicates, and other lower alkyl silicates. Examples of inorganic silicates include lithium polysilicate, sodium silicates, potassium silicates, quaternary ammonium silicates, and the like. The class of solution-type binders is further characterized in that the binders are metal salts. Examples of this class include solutions of sodium silicates, monoaluminum phosphate, potassium silicates, aluminum acid phosphate, zirconium acetate, ammonium zirconyl carbonate, aluminum formate, and the like. Of this group, monoaluminum phosphate is considered to be particularly satisfactory.

The concentration of the binders in the medium in which the binders are dissolved or dispersed, i.e., water or alcohol, may vary over a wide range. By way of example, binder concentrations may range from 5 to 60 percent by weight or higher. In general, a lower range of from about 5 to 35 percent by weight applies to solution-type binders and a higher concentration range of from about 15 to 60 percent by weight or higher applies to the colloidal-type binders. The upper concentration of the solution-type binders is frequently set by the viscosity of the solution. Too viscous a liquid will not penetrate the pore structure of the cores. The upper limit of the concentration of the colloidal-type binders may be set by the need to obtain a core which will be sufficiently permeable to the mold gases which are produced during casting. When the cores made in accordance with this invention are dried and investment molds containing the cores are heated prior to casting, the liquid medium in which the impregnating agent is dispersed or dissolved is removed from the cores to obtain the desired core permeability. Since the binders themselves are usually at least twice as dense as the medium in which they are dispersed or dissolved, the concentration of the binder is lower on a volume basis than on a weight basis. Hence, even at high concentrations, such as a 60 percent by weight binder concentration, satisfactory permeability can be produced in the final core following removal of the liquid medium. When employing the colloidal-type binders, the individual particles should be smaller than the pores of the cores which are to be impregnated. Otherwise the impregnating agent or binder will be filtered out on the surface of the core. Satisfactory results have been obtained using colloidal-type binders which have a particle size less than 70 millimicrons.

Colloidal silica sols are especially preferred for use as the impregnating agent because of the convenient procedures which can be employed to precipitate the silica. The preferred colloidal dispersions may be stabilized both by acid and alkali. Acid-stabilized sols can be gelled by the addition of alkali materials to raise the pH above about 5. Alkali-stabilized sols become unstable in the presence of foreign ions and the gel time can be conveniently regulated by adding a proper amount of any of a wide variety of salts, including sodium chloride, sodium acetate, ammonium acetate, ammonium chloride, and the like. Aqueous colloidal silica dispersions can be frozen to precipitate the silica which remains in the precipitated state when the material is subsequently thawed.

The time and manner of impregnating the cores can be varied widely. In many instances complete impregnation of the core structure is desired, and in such cases the minimum impregnating time is that required to achieve the desired penetration of the pores. The operation can be readily carried out by immersing the cores in the liquid impregnating agent under a partial vacuum in order to assure complete penetration of the pore structure in the shortest length of time. If desired, a suitable wetting agent may be added to the liquid impregnating agent in order to promote penetration of the pores of the cores. The use of a vacuum is not essential and satisfactory results can be obtained in most instances by dipping the cores under normal atmospheric pressure. In some cases less than complete penetration of the core structure may be satisfactory and even desirable. For example, when the non-subliming binder can be softened or otherwise attacked by the impregnating agent, the time of impregnation is accordingly limited. Complete impregnating of the core structure also may be necessary in situations where increased surface hardness rather than strength is of primary importance.

Following impregnation, the liquid impregnating agent is hardened. The hardening step can be carried out by different procedures in order to obtain varying combinations of core strength and hardness, as may be desired because of particular core shaped and/or to meet particular casting requirements. According to one such procedure hardening of the liquid impregnating agent is accomplished by evaporating the carrier liquid, as by air drying. When the liquid impregnating agent is hardened by evaporation of the liquid medium in which the binder used for impregnations is dispersed or dissolved, the binder material tends to migrate toward the core surfaces with the evaporating liquid and is deposited in a layer at the surfaces. This results in an extremely hard surface on the core and leaves the interior relatively soft and weak. This may be deisrable in some instances, as when the cores are to be subjected to extremely errosive conditions.

In other cases a more uniform depositing of the binder material used for impregnation throughout the pore structure is desired. For example, an accumulation of the binder material in the outer portion of cores having large flat surfaces may not be desired because of the tendency of such cores to spall when molds containing the cores are heated preparatory to casting. In such cases, a preferred hardening procedure is to gel or precipitate the binder material used for impregnation within the pores before the liquid medium has had a chance to migrate to the core surface and evaporate. Such a procedure results in cores which are stronger than cores produced by air drying of the impregnating agent, but which may be less hard on the surface. The two hardening techniques also can be combined to vary the core properties by first permitting partial evaporation of the carrier liquid followed by gelling or precipitation of the remaining impregnating agent in the pores.

The impregnating agent can be caused to deposit uniformly throughout the pore structure of the cores in a number of ways depending upon the particular material used for impregnation. As mentioned above, the preferred aqueous colloidal silica dispersions can be frozen to precipitate the silica which remains in the precipitated state when the material is subsequently thawed. Freezing of cores impregnated with aqueous colloidal silica has been found to be a particularly convenient and satisfactory technique for uniformly depositing the silica throughout the core.

Another expedient is to add gelling agents to the liquid impregnating agent to render it unstable so that it will gel and harden spontaneously in a controlled length of time. The time for gelling and hardening can be adjusted to permit the impregnating operation to be carried out successfully. Another expedient is to dip the impregnated cores into a liquid gelling agent which is capable of gelling the impregnating material on contact. Still another technique is to include a gelling agent in the core itself, the potency of the gelling agent being adjusted so as to permit impregnation to be carried out successfully followed by gelling of the impregnating agent within the pores in a controlled length of time.

After the impregnating agent has been hardened in place by any of the above techniques or by any other procedure, the cores are preferably dried to remove free water or other carrier liquid. The drying step can be omitted in some instances, but is generally found to be advantageous in order to obtain maximum strength. Vacuum drying or air drying with moderate air circulation are satisfactory procedures. Controlled oven drying also can be used.

The invention is illustrated by the following examples. Unless otherwise specified, the percentages are given as percentages by weight.

EXAMPLE I

A core batch was prepared of the following composition:
75 percent refractory blend
21 percent paradichlorobenzene
4 percent ethyl cellulose, 20 cps The refractory blend consisted of the following ingredients:
59 percent zircon flour, (45 percent plus 325 mesh)
39 percent fused silica (100 percent minus 200 mesh, 75 percent minus 325 mesh)
2 percent nepheline syenite The core batch was prepared by first blending together the refractory powders and then warming the refractory blend to approximately 200°F. The paradichlorobenzene was melted and the ethyl cellulose dissolved in it. All of the ingredients were combined using a mixer having a "whip" type agitator. The core batch was granulated by cooling to solidifaction while continuing agitation. Alternatively, the blended mixture can be poured into slabs which are cooled and then broken up in a separate operation.

A variety of cores for commercial parts were molded from the core batch using a standard plastic injection molding machine. The machine was of the plungertype with horizontal injection and vertical mold opening and closing. The injection temperature was about 155°F. and the injection pressures ranged from 500–700 psi depending upon core configuration, although higher pressures could have been employed satisfactorily.

The step of removing the paradichlorobenzene was accomplished by placing the injection molded cores in a vacuum chamber operating at room temperature under a reduced pressure of approximately 27 inches of mercury below atmospheric pressure for a length of time suitable to remove substantially all of the subliming binder. The time for removing the subliming binder varied from four to 10 hours depending upon the sizes and shapes of the cores.

After the subliming operation, some of the cores were impregnated under a vacuum with an aqueous colloidal silica sol (SYNTON FM, manufactured by Monsanto Chemical Co.). The sol was a "fine particle size" sol containing 30 percent by weight colloidal silica particles having an approximate particle dimension of 7–8 millimicrons. The time for impregnation varied from 45 to 60 minutes. Subsequent tests have shown that much shorter impregnation times are practical and often desirable. As little as two minutes is often sufficient and even a shorter time may be feasible for very small cores. Following impregnation, the cores were rinsed quickly in water and placed in the freezing compartment of a standard home refrigerator until frozen hard. The cores were then removed and allowed to thaw and dry in a gentle current of air. The cores were ready for use immediately after drying, but also could be stored for indefinite periods after use, if desired.

Other cores were sintered instead of being impregnated. The sintering operation was carried out by firing the cores to a temperature in the range of from 2000° – 2300°F.

The cores were incorporated into disposable patterns in two ways. Simple cores were inserted directly into openings in the patterns. In instances where this was not possible or desired, the cores were inserted into a pattern injection mold and wax was injected around the cores. The patterns containing the cores were assembled into set-ups of the type conventionally used in making ceramic shell molds, and the set-ups were processed according to normal ceramic shell practice.

The ceramic shell molds were fired to temperatures ranging from 1600°F. to 200°F., and various molten steel alloys were cast into the molds against the cores to produce castings. The cores were then removed from the castings in a molten caustic bath.

EXAMPLE II

A refractory mixture of the following composition was prepared in the manner set forth in Example I:
77 percent refractory blend (same as Example I)
22 percent paradichlorobenzene
1 percent ethyl cellulose, 20 cps The mixture was heated to a fluid consistency and poured into a steel mold. The paradichlorobenzene was removed in a vacuum chamber operating at room temperature. After removal of the subliming binder, the molded article was found to have a modulus of rupture of 293 psi.

EXAMPLE III

Transverse strength specimens were molded on a plastic injection machine from the following composition:
75.2 percent refractory blend
21.0 percent paradichlorobenzene 0.8 percent shellac
3.0 percent silicone resin The refractory blend consisted of 60 percent zircon, 325 mesh and 40 percent fused silica.

The mixture was prepared and the paradichlorobenzene was removed by sublimation under vacuum in the manner described in Example I. The average modulus of rupture of the specimens was found to be 327 psi.

Additional transverse strength specimens were made in the identical manner from the following composition:

75.2 percent refractory blend (60 percent zircon, minus 325 mesh, 40 percent fused silica)
21.0 percent paradichlorobenzene
0.8 percent shellac
2.5 percent silicone resin
0.5 percent ethyl cellulose After sublimation, the average modulus of rupture was found to be 576 psi. These comparative tests demonstrated an increase in the transverse strength of 76 percent resulting from the substitution of 0.5 percent ethyl cellulose for a like amount of silicone resin.

EXAMPLE IV

A core batch was prepared of the following composition:

73.6 percent refractory blend
21.0 percent paradichlorobenzene
3.4 percent powdered shellac
1.0 silicone resin
1.0 percent ethyl cellulose, 20 cps The refractory blend consisted of the following ingredients:

58.8 percent zircon flour, 325 mesh
39.2 percent fused silica powder
2.0 percent nepheline syenite A variety of cores were injection molded from the core batch using a standard plastic injection molding machine as described in Example I. The injection conditions were as follows:

cylinder temperature    180°F.
nozzle temperature    180°F.
injection time    6 seconds
cycle time    12–60 seconds depending upon core size
injection pressure    900–1200 psi depending upon core configuration The paradichlorobenzene was sublimed from the cores under a vacuum at a temperature not exceeding 90°F. The cores were then impregnated under a vacuum with an aqueous colloidal silica sol as described in Example I, frozen, and thawed and dried in front of a fan at room temperature. The cores made in this manner were incorporated directly into disposable patterns which were used to make investment casting molds in the usual manner. The castings consisted of various commercial parts made in a variety of alloys.

EXAMPLE V

A core batch was prepared of the following composition:

73.6 percent refractory blend
21.0 percent paradichlorobenzene
3.4 percent silicone resin
1.0 percent shellac
1.0 percent ethyl cellulose, 20 cps The refractory blend consisted of the following ingredients:

59.4 percent zircon flour, 325 mesh
39.6 percent fused silica
1.0 percent nepheline syenite Cores were injection molded from the mixture in the manner and under the conditions described in Example IV. A portion of the injection molded cores were sublimed under a vacuum at room temperature and were then fired and sintered for two hours at a temperature of 2200°F. The sintered cores were found to have an average modulus of rupture of 2375 psi.

The remaining cores were impregnated with colloidal silica sol as described in Example I, frozen, and thawed and dried in front of a fan at room temperature. The impregnated cores were found to have an average modulus of rupture of 2509 psi after having been fired to 2000°F. for two hours.

Many modifications and variations of the invention will be apparent to those skilled in the art in view of the foregoing detailed description. Therefore, it is to be understood that, within the scope of the appended claims, the invention can be practiced otherwise than as specifically disclosed.

What is claimed is:

1. In a refractory mixture comprising:
   a. comminuted refractory material as the major component,
   b. from 10–35 percent by weight of the total weight of said mixture of a first binder which is in a solid state at room temperature and is characterized by the capability of being changed from a solid to a flowable state and of being resolidified at room temperature, and by a vapor pressure of at least 0.1 mm of Hg at the triple point under normal atmospheric pressure of substantially one atmosphere, and
   c. from 0.8–11 percent by weight of the total weight of said mixture of a second binder which is in a solid state at room temperature and has the characteristics of being miscible with said first binder when it is in a flowable state, the capability of being hardened to impart strength to articles molded from said mixture, and a vapor pressure lower than that of said first binder so that said second binder will hold molded articles intact during sublimation of said first binder, said second binder being at least one material selected from the class consisting of natural and synthetic resins, the improvement wherein said second binder consists of ethyl cellulose in an amount of from 4.5–100 percent by weight of the total weight of said binder, said ethyl cellulose being present in a minimum amount of 0.5 percent by weight of the total weight of said mixture.

2. In a method of making refractory articles by the procedure which includes the steps of preparing a mixture consisting essentially of:
   a. comminuted refractory material as the major component,
   b. from 10–35 percent by weight of the total weight of said mixture of a first binder which is in a solid state at room temperature and is characterized by the capability of being changed from a solid to a flowable state and of being resolidified at room temperature, and by a vapor pressure of at least .1 mm of Hg at the triple point under normal atmospheric pressure of substantially one atmosphere, and c. from 0.8–11 percent by weight of the total weight of said mixture of a second binder which is in a solid state at room temperature and has the characteristics of being miscible with said first binder when it is in a flowable state, the capability of being hardened to impart strength to articles formed from said mixture, and a vapor pressure lower than that of said first binder to that said second binder will hold articles molded from said mixture intact during sublimation of said first binder, said second binder being at least one material selected from the class consisting of natural and synthetic resins, the improvement wherein said second binder consists of ethyl cellulose in an amount of from 4.5–100 percent by weight of the total weight of said second binder, said ethyl cellulose being present in a minimum amount of 0.5 percent by weight of the total weight of said mixture.

* * * * *